US011635039B1

(12) United States Patent
Dou et al.

(10) Patent No.: US 11,635,039 B1
(45) Date of Patent: Apr. 25, 2023

(54) WORK VEHICLE ALCOHOL-BASED POWER SYSTEM WITH ON-BOARD ETHER

(71) Applicant: Deere & Company, Moline, IL (US)

(72) Inventors: Danan Dou, Cedar Falls, IA (US); Craig W. Lohmann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/659,368

(22) Filed: Apr. 15, 2022

(51) Int. Cl.
| | | |
|---|---|---|
| *F02D 19/06* | (2006.01) |
| *F02D 41/06* | (2006.01) |
| *F02M 31/125* | (2006.01) |
| *F02D 41/38* | (2006.01) |
| *F02M 27/02* | (2006.01) |
| *F02M 31/20* | (2006.01) |
| *F02M 26/22* | (2016.01) |

(52) U.S. Cl.
CPC ......... *F02D 41/38* (2013.01); *F02D 19/0647* (2013.01); *F02D 19/0655* (2013.01); *F02D 41/064* (2013.01); *F02M 26/22* (2016.02); *F02M 27/02* (2013.01); *F02M 31/125* (2013.01); *F02M 31/20* (2013.01); *F02D 2200/021* (2013.01)

(58) Field of Classification Search
CPC ............. F02D 19/0647; F02D 19/0655; F02D 41/064; F02D 41/38; F02M 27/02; F02M 31/125
USPC .................................. 123/1 A, 3, 179.8, 576
See application file for complete search history.

(56) References Cited

U.S. PATENT DOCUMENTS

| | | | | |
|---|---|---|---|---|
| 4,876,989 A | * | 10/1989 | Karpuk ..................... | F02B 1/02 123/179.8 |
| 5,097,803 A | * | 3/1992 | Galvin ................ | F02D 19/0655 123/3 |
| 6,340,003 B1 | * | 1/2002 | Schoubye ............... | F02B 43/10 123/3 |
| 7,261,065 B2 | * | 8/2007 | Aimoto ................ | F02D 19/081 123/3 |
| 7,856,950 B2 | * | 12/2010 | Kuzuoka ................ | F02M 25/00 123/304 |

(Continued)

FOREIGN PATENT DOCUMENTS

EP 1106803 A2 * 6/2001 ................ F02B 3/08

OTHER PUBLICATIONS

Srinivasan et al., Enhanced Ethanol Dehydration on y-Al2O3 Supported Cobalt Catalyst, © 2019 published by Elsevier, https://www.elsevier.com/open-access/userlicense/1.0/ (52 pages).

(Continued)

*Primary Examiner* — Erick R Solis
(74) *Attorney, Agent, or Firm* — Klintworth & Rozenblat IP LLP

(57) ABSTRACT

A power system for a work vehicle includes an alcohol tank configured to store alcohol; a catalytic converter fluidly coupled to receive alcohol from the alcohol tank and configured to convert the alcohol into ether; and an engine including one or more piston-cylinder sets configured to selectively receive the alcohol stored in the alcohol tank and the ether converted by the catalytic converter and to combust the alcohol and the ether with air to produce mechanical power and exhaust gas.

18 Claims, 7 Drawing Sheets

(56) References Cited

U.S. PATENT DOCUMENTS

| | | | | |
|---|---|---|---|---|
| 8,820,269 | B2* | 9/2014 | Duwig | C10L 1/02 |
| | | | | 123/3 |
| 8,955,468 | B2* | 2/2015 | Duwig | C10L 1/026 |
| | | | | 123/557 |
| 9,261,053 | B2* | 2/2016 | Jacob | F02M 26/28 |
| 9,447,724 | B2* | 9/2016 | Morris | C10L 1/328 |
| 9,624,447 | B2* | 4/2017 | Doering | C10L 1/02 |
| 9,903,262 | B2 | 2/2018 | Edwards et al. | |
| 10,590,866 | B2* | 3/2020 | Magnusson | F02M 25/12 |
| 2011/0100323 | A1* | 5/2011 | Bradley | F02D 19/061 |
| | | | | 123/304 |
| 2015/0285139 | A1* | 10/2015 | Edwards | F02D 41/0062 |
| | | | | 60/605.2 |
| 2021/0054777 | A1 | 2/2021 | Blumreiter et al. | |

OTHER PUBLICATIONS

Deere & Company, Cold-Weather Start Aids, @ salesmanual.deere.com/sales/salesmanual/en_NA/tractors/attachments/engine/8030/8030_9I_cold_start_9029.html. Dec. 26, 2021 (2 pages).

* cited by examiner

WORK VEHICLE ALCOHOL-BASED POWER SYSTEM WITH ON-BOARD ETHER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. For many work vehicles, the power system includes a diesel engine that may have higher lugging, pull-down, and torque characteristics for associated work operations. However, diesel and other types of fossil fuel-based engines may generate undesirable emissions.

Ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are generally not suitable for in heavy work applications.

SUMMARY OF THE DISCLOSURE

The disclosure provides a work vehicle alcohol-based power system of that generates and uses on-board ether to facilitate ignition and support operation in a range of conditions.

In one aspect, the disclosure provides a power system for a work vehicle. The power system includes an alcohol tank configured to store alcohol; a catalytic converter fluidly coupled to receive alcohol from the alcohol tank and configured to convert the alcohol into ether; and an engine including one or more piston-cylinder sets configured to selectively receive the alcohol stored in the alcohol tank and the ether converted by the catalytic converter and to combust the ethanol and the ether with air to produce mechanical power and exhaust gas.

In a further aspect, the engine of the power system is a compression combustion engine.

In a further aspect, the alcohol of the power system is ethanol and the ether is diethyl ether.

In a further aspect, the power system further includes an ether fuel rail configured to inject the ether into the piston-cylinder sets.

In a further aspect, the ether of the power system is introduced into the piston-cylinder sets with the air.

In a further aspect, the ether is mixed with ethanol prior to injection into the piston-cylinder sets.

In a further aspect, the power system further includes an electric heating element configured to heat the catalytic converter in order to facilitate the conversion of ethanol into ether.

In a further aspect, the catalytic converter of the power system is arranged such that the exhaust gas heats the catalytic converter in order to facilitate the conversion of ethanol into ether.

In a further aspect, the power system further includes an exhaust gas recirculation (EGR) arrangement configured to direct at least a portion of the exhaust gas back into the engine. The EGR arrangement includes an EGR cooler configured to cool the portion of the exhaust gas, and the EGR cooler is integrated with the catalytic converter such that heat is transferred from the exhaust gas to the catalytic converter in order to facilitate conversion of the ethanol into ether.

In a further aspect, the power system further includes an ether reservoir to store the ether.

In a further aspect, the power system further includes an air intake arrangement that includes a charge air cooler configured to cool the air prior to introduction into the engine, wherein the charge air cooler is integrated with the ether reservoir such that heat is transferred from the air in the charge air cooler to the ether reservoir.

In a further aspect, wherein the ratio of ether to ethanol of the power system introduced into the engine is approximately 0.5%-95%.

In a further aspect, the power system further includes controller configured to selectively control an amount of ethanol and an amount of ether that are directed into the engine.

In a further aspect, wherein the controller of the power system is configured to receive temperature information and the selectively control the amount of ethanol and the amount of ether that are directed into the engine based on the temperature information.

In a further aspect, when the temperature information indicates a first temperature is less than a temperature threshold, the controller of the power system is configured to direct both ethanol and ether into the engine; and when the temperature information indicates the first temperature reaches or exceeds the temperature threshold, the controller is configured to direct only ethanol into the engine.

In another aspect, the disclosure provides a method for operating a work vehicle power system with a compression combustion engine. The method includes directing a first portion of ethanol from an ethanol tank into a catalytic converter; converting the first portion of ethanol within the catalytic converter into diethyl ether; storing the diethyl ether in an ether reservoir; directing a second portion of the ethanol from the ethanol tank into the compression combustion engine for ignition and combustion; and selectively directing the diethyl ether from the ether reservoir into the compression combustion engine to supplement the ignition and combustion of the second portion of the ethanol.

In a further aspect, the method further includes collecting temperature information with one or more temperature sensors to determine a cold start condition; and wherein the selectively directing the diethyl ether from the ether reservoir into the compression combustion engine occurs during the cold start condition of the compression combustion engine.

In a further aspect, the selectively directing the diethyl ether from the ether reservoir into the compression combustion engine is discontinued when the temperature information indicates that the engine is no longer in the cold start condition.

In a further aspect, the method further includes heating the catalytic converter to facilitate the conversion of the first portion of ethanol into the diethyl ether.

In a further aspect, the method further includes maintaining a temperature of the ether reservoir at less than 100° C.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
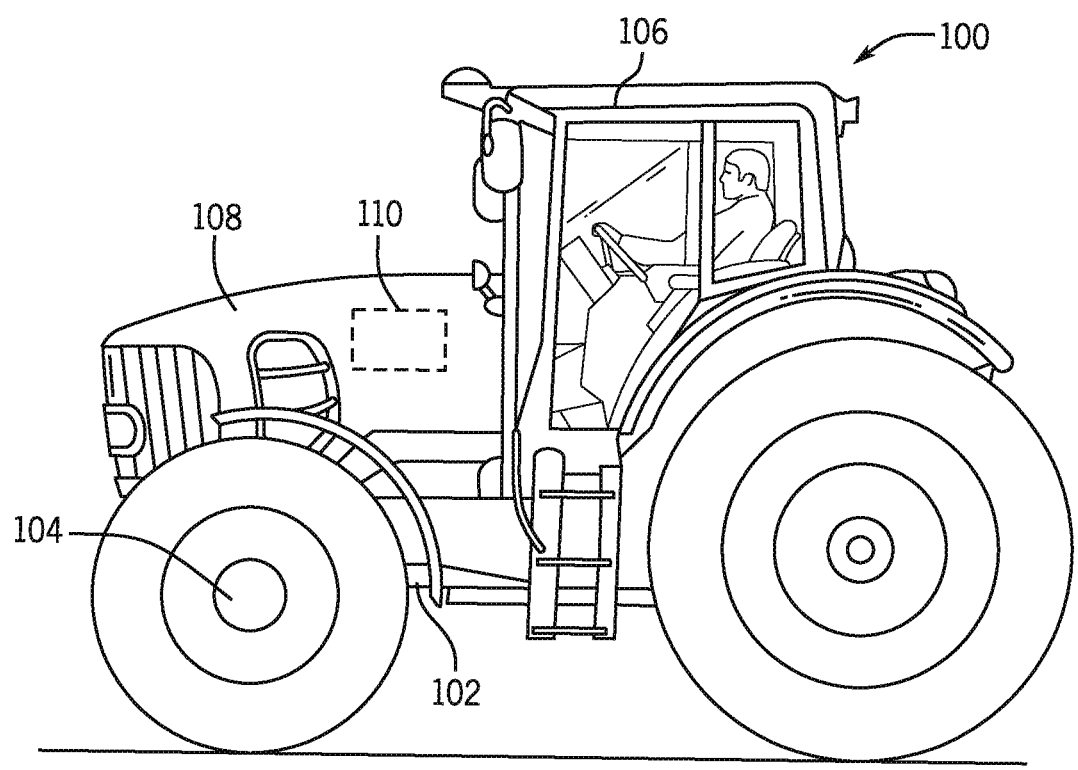
FIG. 1 is a simplified side view of an example work vehicle in the form of a tractor in which a power system may be used in accordance with this disclosure.

The following describes one or more example embodiments of the disclosed power system and method, as shown in the accompanying figures of the drawings described briefly above. Various modifications to the example embodiments may be contemplated by one of skill in the art.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel and other types of fossil fuel-based engines may generate undesirable emissions. In contrast, ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are typically not suitable for in heavy work applications.

In compression combustion engines (e.g., in diesel-type engines), ethanol is generally not used due to its relatively low cetane number (e.g., less than 5) that requires high temperatures for ignition. In other words, compression combustion engines that rely upon ethanol may encounter challenges in cold start and low load conditions in which the temperature is insufficient for reliable ignition.

According to examples discussed herein, a power system may include an engine that primarily operates on alcohol (e.g., methanol, ethanol, propanol, etc.) and is supplemented with ether. Such power systems may include an on-board catalytic converter that converts a portion of the ethanol into diethyl ether (generally "ether"). In one particular example and described in greater detail, the alcohol is ethanol, although the principles discussed herein are applicable to other types of alcohol forms. In some examples, the alcohol and/or ether may be controlled by a control method in which the ether is converted on command under certain conditions, utilized under certain conditions, and terminated under certain conditions.

Ether has a relatively high cetane number of approximately 125, which is even greater than diesel (e.g., approximately 50). In practice, ether may be injected into the engine via the fuel arrangement or the air arrangement to facilitate ignition of the ethanol, thereby enabling superior ignition properties while maintaining diesel-like performance. The ether may improve ignition characteristics even at relatively small amounts and enable the use of ethanol at very cold ambient temperatures or low operational loads. The implementation of ethanol and ether as fuels may be facilitated by other aspects of the power system. In some examples, the heat of the exhaust and/or the heat otherwise accommodated by cooling elements (e.g., in air charge cooler or exhaust gas recirculation (EGR) system) may be utilized by the catalytic converter to facilitate conversion of ethanol to ether.

Referring to FIG. 1, in some embodiments, the disclosed power systems and methods that use alcohol (e.g., ethanol) and on-board converted ether may be implemented with a work vehicle 100 embodied as a tractor. In other examples, the disclosed system and method may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented by the drive assembly 104 mounted on the chassis 102 based on commands from an operator in the cabin 106 and/or as automated within the controller 110.

As described below, the power system 108 may include systems and components to facilitate various aspects of operation. As described below, the power system 108 may particularly include an engine that selectively utilizes both alcohol (e.g., ethanol) and ether for combustion that may result in improvements in emissions, performance, efficiency, and capability. Otherwise, the power system 108 may include an intake air arrangement to direct air into the engine and a fuel arrangement to direct fuel (or fuels) into the engine for mixing with the air for combustion, as well as optional additional systems, such as turbocharger and/or exhaust recirculation (EGR) arrangements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of alcohol (e.g., ethanol) and ether. The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the control of alcohol (e.g., ethanol) and/or ether. Although not shown or described in detail herein, the work vehicle 100 may include any number of additional or alternative systems, subsystems, and elements.

Additional information regarding the power system 108, particularly the components associated with fuel and gas flows are provided below. As introduced above and as will now be described in greater detail with reference to FIGS. 2-7, the power system uses alcohol (e.g., ethanol) as a primary fuel and further converts ethanol into ether to support combustion, particularly at low temperature or low load conditions. Generally, in the discussion below, ethanol is described as the alcohol fuel; however, other types of alcohol forms may also be used.

Figure 2:
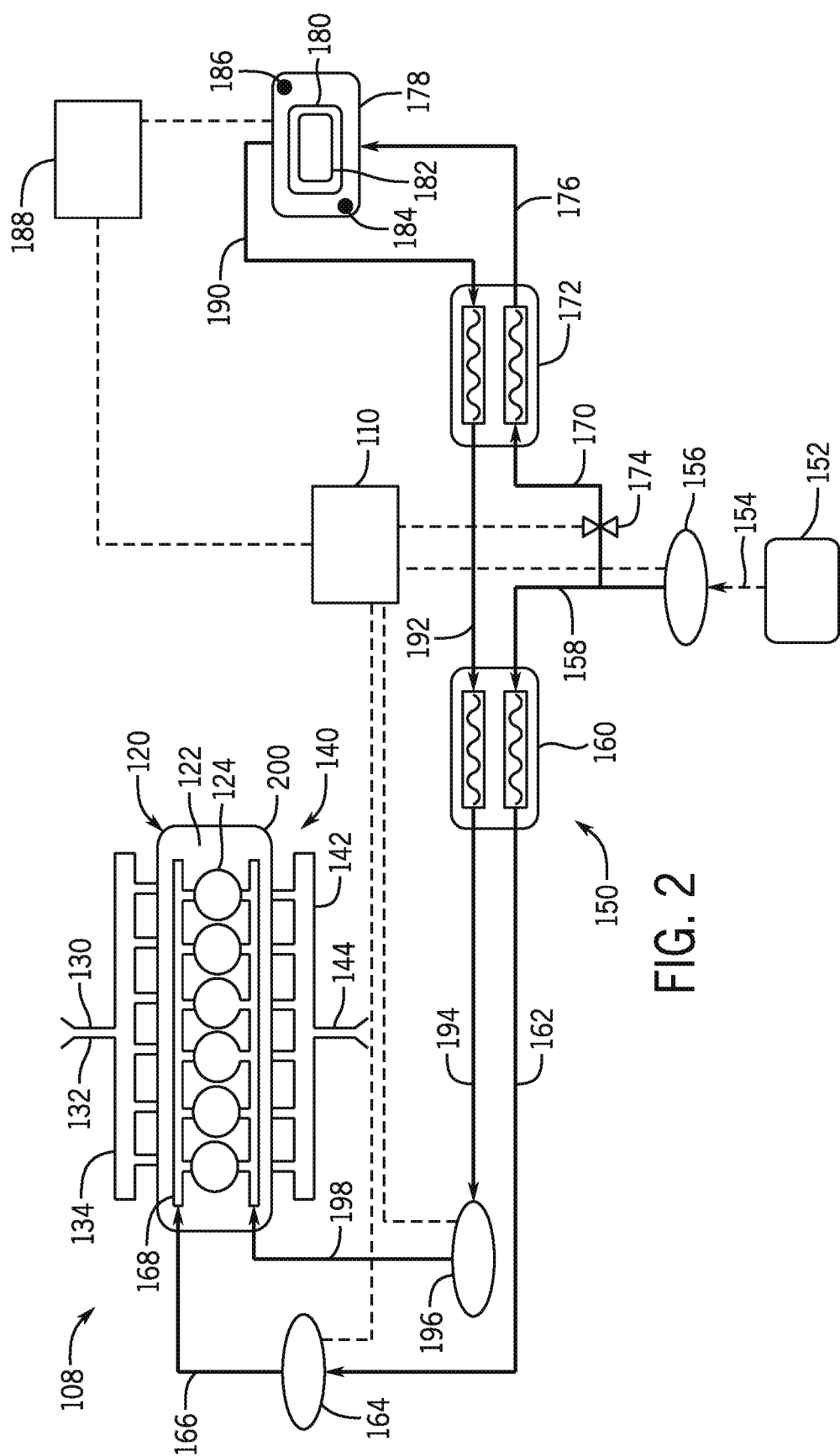
FIG. 2 is a simplified schematic diagram of a power system in accordance with an example embodiment.

Reference is initially made to FIG. 2, which is a schematic illustration of the power system 108 for providing power to the work vehicle 100 of FIG. 1, although the characteristics described herein may be applicable to a variety of machines. The configuration of FIG. 2 is just one example of the power system 108 and example embodiments according to the disclosure herein may be provided in other configurations.

As introduced above, the power system 108 includes an engine 120 configured to combust a mixture of fuel from a fuel arrangement 150 and air from an air intake arrangement 130 to generate power for propulsion and various other systems, thereby generating an exhaust gas that is accommodated by an exhaust arrangement 140. As also introduced above, various aspects of the power system 108 may be operated by the controller 110 based on operator commands and/or operating conditions. In some examples, the controller 110 may be a dedicated power system controller or a fuel controller.

As described in greater detail below, the engine 120 is primarily an ethanol engine that is supplemented, as appropriate, with ether. Such an engine 120 may be similar to a diesel engine (i.e., compression combustion) in configuration and arrangement, except that ethanol and/or ether are combusted instead of diesel. The engine 120 may have any number or configuration of piston-cylinder sets 122 within an engine block 124. In the illustrated implementation, the engine 120 is an inline-6 (I-6) engine defining six piston-cylinder sets 122. In addition to those discussed below, the engine 120 may include any suitable feature, such as cooling systems, peripheries, drivetrain components, sensors, etc.

As noted above, the engine 120 is selectively provided air for combustion by the air intake arrangement 130. The air intake arrangement 130, in this example, includes an intake conduit 132 and an air intake manifold 134. The air intake arrangement 130 directs fresh or ambient air through the air intake conduit 132 into the air intake manifold 134 for introduction into the piston-cylinder sets 122 of the engine block 124 to be ignited with the fuel (e.g., ethanol and/or ether) such that the resulting combustion products drive the mechanical output of the engine 120, as described in greater detail below.

The exhaust gas produced from the combustion process may be received by the exhaust arrangement 140, which includes an exhaust manifold 142 to receive and distribute the exhaust from the piston-cylinder sets 122. In this example, the exhaust gas is directed from the exhaust manifold 142 into an exhaust conduit 144 out of the work vehicle 100.

As noted above, the engine 120 is selectively fueled by ethanol and/or ether provided by the fuel arrangement 150. In one example, the fuel arrangement 150 may be considered to include ethanol tank 152, one or more pumps 156, 164, 196, an ether reservoir 160, a condenser 172, a catalytic converter apparatus 178, one or more valves 174, one or more lines 154, 158, 162, 166, 170, 176, 190, 192, 194, 198, and one or more fuel rails 168, 200.

In this example, the ethanol tank 152 stores ethanol. Upon command from the controller 110, at least a portion of the ethanol is directed from the ethanol tank 152, via pump 156 and lines 154, 158, through the ether reservoir 160, which also functions as a condenser, as discussed in greater detail below. A pump 164 directs the ethanol via lines 162, 166 into the ethanol fuel rail 168. In one example, the pump 164 and ethanol fuel rail 168 operate at relatively high pressures, for example 1500 bar. In any event, the ethanol is injected by the ethanol fuel rail 168 into the piston-cylinder sets 122 to be mixed with air and combusted, as introduced above.

In addition to the ethanol that is directed from the ethanol tank 152 to the engine 120, at least a portion of the ethanol is converted into ether to support ignition and combustion. In this example, the ethanol is directed, downstream of pump 156, through lines 170, 176, through condenser 172, and into the catalytic converter apparatus 178. The flow of ethanol into the catalytic converter apparatus 178 may be controlled via valve 174 based on commands from the controller 110. Additional information about the condenser 172 is provided below.

Generally, the catalytic converter apparatus 178 functions to convert ethanol into ether, and in this example, may include a heating element 180 and a catalytic converter 182.

In one example, the catalytic converter 182 may generate diethyl ether ("ether") according to the following chemical reaction:

$$2\ CH_3CH_2OH\ (g) = CH_3CH_2OCH_2CH_3(g) + H_2O\ (g)$$

In effect, two ethanol molecules are dehydrated to produce ether and water. The ether, water, and any unconverted ethanol may generally be referenced below as an ether mixture. As noted above, other types of alcohol, including methanol and propanol, may be used as fuel, and such alcohols may also be dehydrated into ether (e.g., dimethyl ether and/or di-propyl ether) in order to facilitate combustion.

The chemical reaction within the catalytic converter 182 is mildly exothermic (e.g., ΔH-24.5 KJ/mole of ether), and therefore, a complicated temperature control of the chemical reaction may not be required. However, in this example, the heating element 180 is provided as an example mechanism of temperature control. The heating element 180 is powered by a power source 188 (e.g., batteries or a generator) based on commands from the controller 110. In some examples, the catalytic converter 182 may particularly operate in a temperature window of 100° to 200° C. As discussed below, the catalytic converter 182 may be a temperature-controlled bed matrix with flow rate, temperature, and pressure-based monitoring.

The catalytic converter apparatus 178 may further include one or more sensors, including a pressure sensor 184 and a temperature sensor 186 to respectively collect pressure and temperature information, that facilitate operation of the power system 108, particularly the conversion, storage, and use of the ether. Additional information regarding the catalytic converter apparatus 178 and control of the power system 108 is provided below.

In this example, from the catalytic converter apparatus 178, the ether mixture is directed through the condenser (or recuperator) 172. As introduced above, the ethanol may also be directed through the condenser 172 upstream of the catalytic converter apparatus 178. The ether from the catalytic converter apparatus 178 may have a relatively high temperature (e.g., approximately 170° C.), and the ethanol may have a relatively low temperature (e.g., approximately 40° C.). As such, the condenser 172 may operate as a heat exchanger in which at least a portion of the heat of the ether mixture is transferred to the ethanol. In one example, the condenser 172 may decrease the temperature of the ether mixture from approximately 170° C. to approximately 70° C. and increase the temperature of the ethanol from approximately 40° C. to approximately 110° C. In effect, the condenser 172 functions to provide an initial heating of the ethanol prior to being further heated in the catalytic converter apparatus 178 as part of the conversion process. The relative cooling of the ether, water, and ethanol of the ether mixture may operate to condense one or more of each, and due to the relative boiling points, the water condenses prior to the unconverted ethanol, which itself condenses prior to the ether.

Downstream of the condenser 172, the ether mixture is directed into the ether reservoir 160. The ether reservoir 160 primarily functions as a storage unit for the ether, water, and/or ethanol of the ether mixture. The ether reservoir 160 may be manufactured as an airtight of stainless-steel vessel and free of metals like copper or aluminum for compatibility with any residual ethanol. Moreover, the reservoir 160 may be sized to hold enough ether for engine cold cranking.

The ether reservoir 160 may be kept at a temperature below 100° C. in order to maintain at least the water in a liquid state. The water may be periodically purged and/or, in some examples, injected into the engine 120 with the ether. As part of this temperature control, the ether reservoir 160 may also operate as a condenser or heat exchanger. In particular, and as introduced above, the relatively low temperature ethanol may be directed through the ether reservoir 160 in which at least a portion of the heat of the relatively high temperature ether mixture is transferred to the ethanol. This operates to cool the ether, water, and any unconverted ethanol of the ether mixture from the catalytic converter apparatus 178 and to heat the ethanol flowing to the engine 120. In one example, the ether mixture may be reduced in temperature from about 70° C. to about 50° C. In some instances, additional drying or desiccation mechanisms may be used. For example, an electric heating element may be used to heat the reservoir 160 in order to evaporate and purge the water and/or ethanol. In further examples, the heat from a charge air cooler and/or from an exhaust gas component may be used for this function.

As noted, the ether reservoir 160 functions as a storage facility for the ether until the ether is needed for combustion (e.g., low power and cold start situations). Details regarding the situations in which the ether is used to facilitate combustion will be provided below. Generally, however, a pump 196 may be used to direct at least the ether from reservoir 160 via lines 194, 198 into the fuel rail 200 for injection into the engine 120. In one example, the ether fuel rail 200 and/or ether pump 196 may operate in a manner similar to a gasoline direct injection apparatus, e.g., as a relatively low-pressure injection system of approximately 250 bar.

In some situations, the ether fuel rail 200 injects pure ether into the engine 120. In other situations, the ether and any byproducts of the ether mixture (e.g., water and unconverted ethanol) may be directly injected into the engine 120 via the fuel rail 200. The nature of the injection may be based on various parameters and characteristics, including the conversion of the ethanol, temperature, pressure, and the like. For example, ether has a lower boiling point than water and ethanol. The diethyl ether has a boiling point of approximately 35° C. (for reference, the boiling point of ethanol is approximately 78° C.). However, the presence of water in the injection may be acceptable, particularly if the fuel rail 200 and associated elements are water tolerant.

As such, in one example, the temperature conditions of the reservoir 160 may dictate the nature of the ether mixture stored in the reservoir 160 and characteristics of the ether flow into the engine 120. For example, when engine 120 has been cooled off and reservoir temperature drops well below 100° C., ethanol and water will be in a liquid state and ether rich fluid enters the engine to assist a cold start. When engine 120 is fully warmed up and the reservoir 160 encounters higher temperatures, water and ethanol of the ethanol mixture are vaporized with the ether and released into the engine for combustion.

It is noted that the ether is not merely added to the ethanol tank 152. Due to the relatively low boiling point of ether, such storage would tend to result in the ether evaporating prior to use. Instead, the ether is converted on-board and stored in the ether reservoir 160 until use.

As noted above, the ether may be selectively introduced into the engine 120 to facilitate ignition of the ethanol. In particular, the ether has a substantially higher cetane number than ethanol, thereby enabling combustion of the ether (and ethanol) in the compression combustion engine 120, even at relatively low temperatures. The relative distribution (e.g., the percentage of ether in comparison to the percentage of ethanol) may vary between 100% ether and 0% ethanol, and 0% ether and 100% ethanol, although more particularly, even during cold start, the distribution of ether to ethanol may be approximately 0.5% to 95%. Generally, however, the ether may be a relatively small amount of the overall fuel flow. As an example, the ether may be approximately 3-5% of the overall fuel provided to the engine 120. At times, particularly when the engine temperature is relatively high, ether may not be necessary, and the introduction of ether may be discontinued.

The controller 110 may be in communication with the engine 120, pumps 156, 164, 196, valve 174, power source 188, sensors 184, 186, and other components. In particular, the controller 110 may, responsive to received inputs, operate to identify a current operational mode or conditions of the power system 108 and output control signals to one or more components in the power system 108 to control and/or modify operation. Additional details about the control of the ether and ethanol will be provided below.

Figure 3:
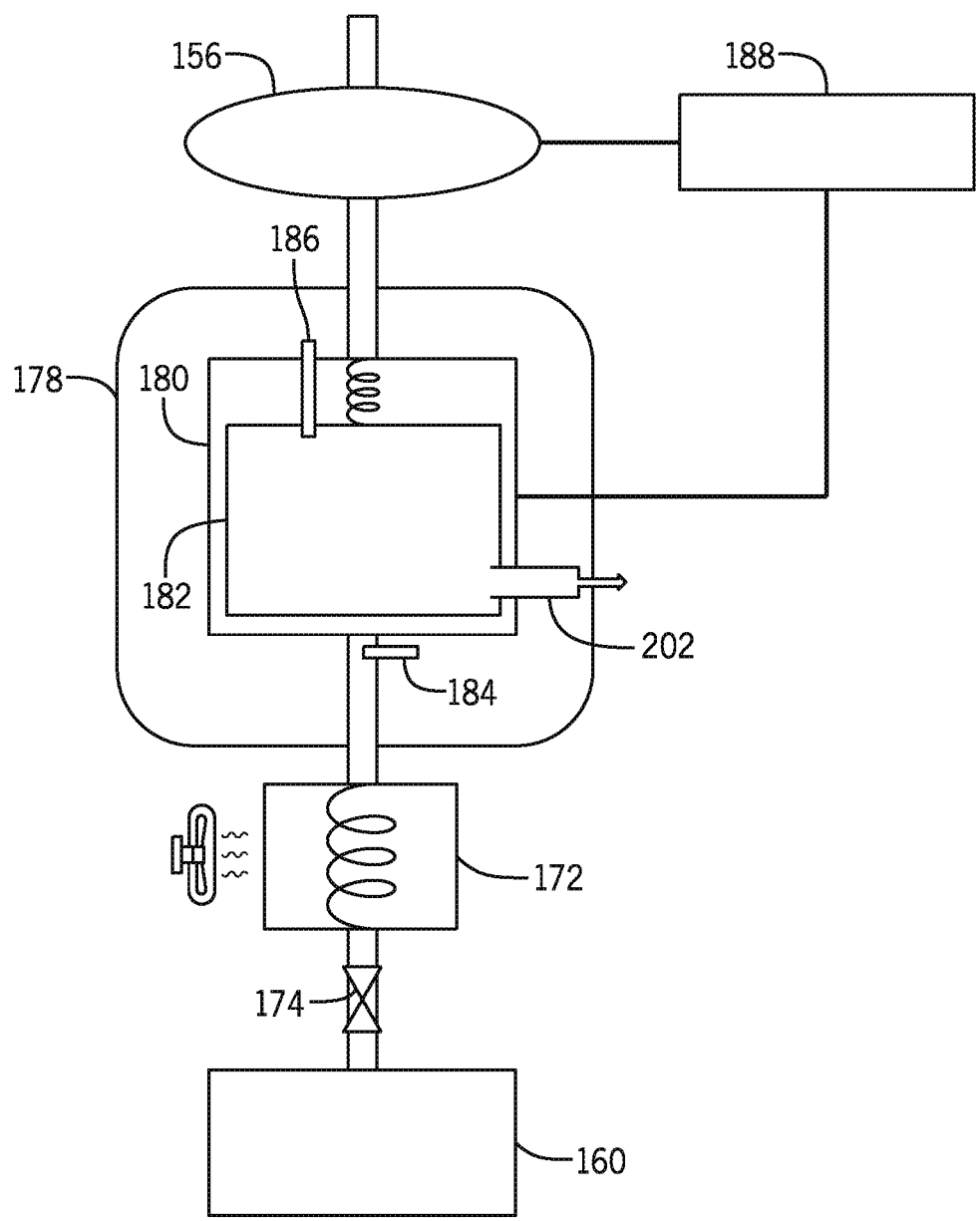
FIG. 3 is a more detailed schematic diagram of a portion of the power system of FIG. 2 in accordance with an example embodiment.

Portions of the power system 108, particularly the catalytic converter apparatus 178, are shown in more detail in the schematic view of FIG. 3. As shown, the catalytic converter apparatus 178 includes the heating element 180 that surrounds the catalytic converter 182. The heating element 180 is powered by a power source 188 (which may additionally provide power to, and shut off, the ethanol pump 156) and functions to increase the temperature within the catalytic converter 182 in order to facilitate the conversion of ethanol into ether. The power from the power source 188 may be driven at 12-24 V and relatively small, approximately 1 kW for a 9 L engine. Generally, the electric heating element 180 provides enhanced, more precise control of the temperature for ethanol conversion. However, as discussed below, other heating mechanisms may be implemented, including leveraging the heat of the exhaust gas.

In one example, the catalytic converter 182 may have a cylindrical housing (e.g., formed of stainless steel and free of copper and aluminum) that houses fluid under pressure at a maximum intended temperature exposure such as 350° C. In some examples, the catalytic converter 182 may be provided with a relief valve 202 that prevents excess pressure, e.g., greater than approximately 30 bar.

The catalytic converter 182 may include a honeycomb or baffle structure supporting a catalyst such that the ethanol may be directed through the housing and over the baffle structure to react with the catalyst for conversion into ether and water, as noted above. As an example, the catalyst may be Cr/Co supported on $\gamma$-$Al_2O_3$ (gamma alumina). If other forms of alcohol are used, the appropriate catalyst may be provided.

The view of FIG. 3 additionally depicts the condenser 172 downstream of the catalytic converter apparatus 178. As noted above, the condenser 172 may function as a heat exchanger to cool the ether mixture by transferring at least a portion of the heat to the ethanol being directed to the catalytic converter apparatus 178 (FIG. 2). In various examples, the condenser 172 may be air cooled or liquid cool by other types of coolants.

As also noted above, the ether mixture is directed downstream of the condenser 172 into the ether reservoir 160 for subsequent distribution to the engine 120. (FIG. 2). In one example, the check valve 174 may be provided to prevent backflow of the ether from the reservoir 160.

Returning briefly to FIG. 2, as introduced above, the controller 110 may control operation of the engine 120, including the fuel arrangement 150 and air intake arrangement 262, as well as various other cooperating systems and components. In particular, the controller 110 may selectively command the relatively amount of ethanol and ether provided to the engine 120 based on one or more parameters.

Figure 4:
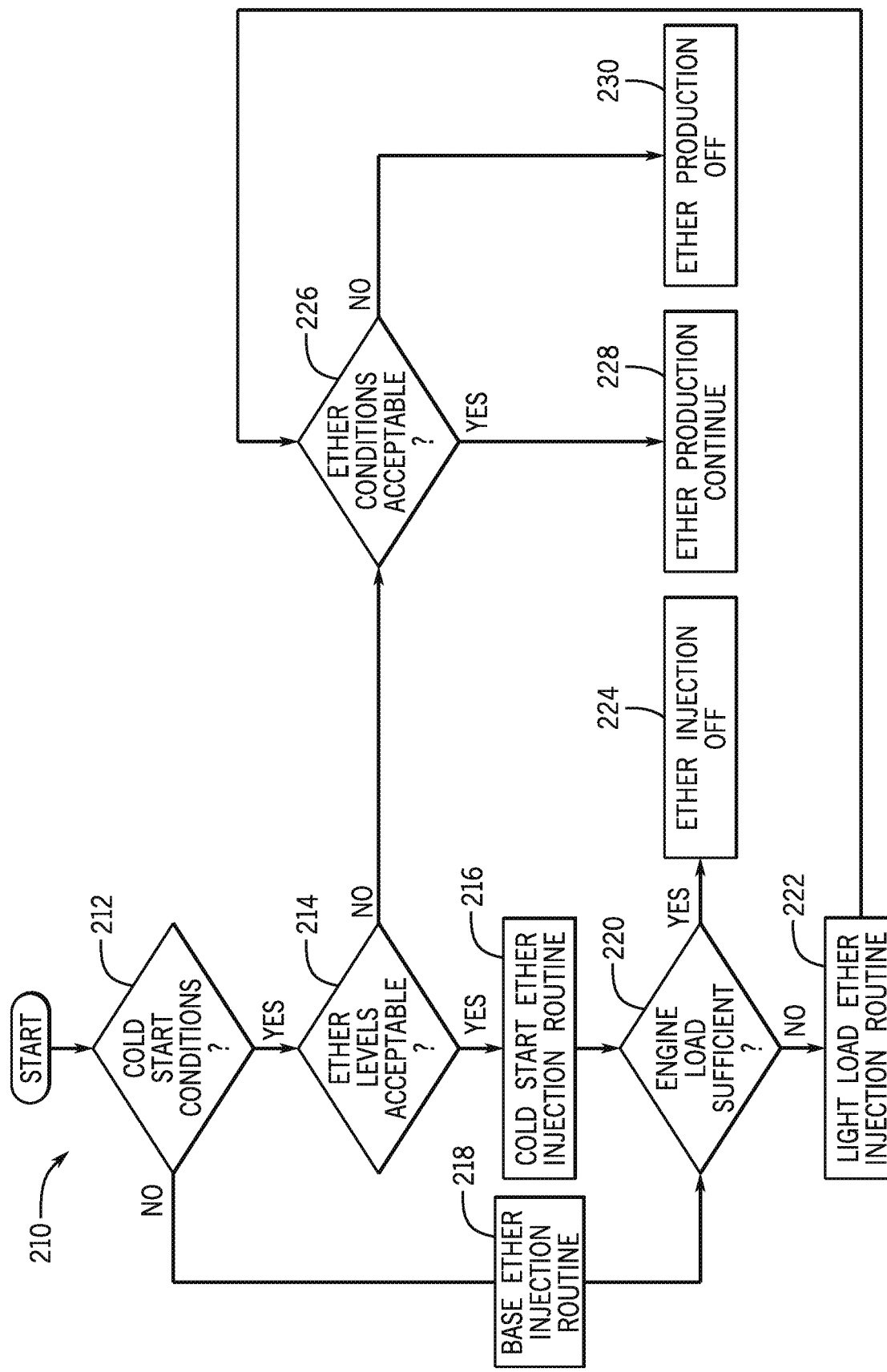
FIG. 4 is a flowchart of a method for operating a power system in accordance with an example embodiment.

Reference is now additionally made to FIG. 4, which is a flowchart with a control method 210 for controlling the ethanol (or other form of alcohol) and ether to the engine 120. The method 210 begins at a start condition, e.g., when the operator desires to start the engine 120 and operate the work vehicle 100 (FIG. 1). Initially, in step 212, the controller 110 evaluates the conditions for a cold start scenario. In particular, the controller 110 may consider temperature information associated with the ambient temperature and/or coolant temperature. Such temperature information may be provided by temperature sensors. Generally, such low temperatures may indicate that ethanol alone will be insufficient for ignition. As such, if the ambient temperature is less than an ambient temperature threshold and/or the coolant temperature is less than a coolant temperature threshold, the method 210 proceeds to step 214; and otherwise, to step 218, each of which are discussed below.

In step 214, the controller 110 evaluates the current level of ether in the ether reservoir 160. If the ether levels are greater than a predetermined ether level threshold, the method 210 proceeds to step 216; and if the ether levels are below the predetermined ether threshold, method proceeds to step 226.

In step 216, the controller 110 initiates the cold start injection routine in which ether is directed into the engine 120 to facilitate ignition. In particular, and referring to FIG. 2, the controller 110 may command the ether pump 196 to direct ether from the ether reservoir 160 to the ether fuel rail 200 for injection. As noted, even if the temperatures are insufficient to convert ethanol into ether, previously converted ether is stored in the ether reservoir 160 for use. Subsequently, the method 210 proceeds to step 220.

Returning briefly to step 212, if the cold start conditions are not present, the method 210 proceeds to step 218 in which a base ether injection routine is implemented. In the base ether injection routine, a predetermined amount of ether based on engine and operating conditions is injected into the engine 120 to facilitate ignition.

In step 220, the controller 110 evaluates the engine load conditions. If the engine load is relatively low in step 220, the method 210 proceeds to step 222 in which the controller 110 initiates the light load ether injection routine. Under these conditions, the controller 110 may command the ether pump 196 to direct ether from the ether reservoir 160 to the ether fuel rail 200 for injection.

If the engine load is relatively high in step 220, the method 210 proceeds to step 224 in which the controller 110 operates the power system 108 without ether such that ethanol is the only source of fuel. Subsequently, the method 210 proceeds to step 226.

In step 226, the controller 110 evaluates the ether conditions of the power system 108, including conditions associated with the exhaust temperature and the ether level of the ether reservoir 160. The exhaust temperature may be derived or determined based on information from an exhaust temperature sensor; and the level of the ether reservoir 160 may be based on an ether level sensor. In effect, the exhaust temperature may be used as a proxy or indication for the ability of the compression combustion engine 120 to operate without (or with) ether and/or the ability to create ether; and the ether level may indicate the need for converting ethanol into additional ether. In one example, the exhaust temperature may be considered with respect to a maximum and minimum temperature threshold range in which a minimum temperature threshold represents the temperature necessary to converter ethanol into ether and a maximum temperature threshold represents the temperature at which the engine 120 no longer needs ether. As such, in step 226, the controller 110 may compare the exhaust temperature to an exhaust temperature range and the ether level may be compared to a maximum ether level threshold. As one example, the range may be approximately 100° C. to 200° C. The maximum ether level threshold may be selected based on the total capacity of the ether reservoir 160.

In step 226, if the exhaust temperature is within the exhaust temperature range and if the ether level is less than the maximum ether level threshold, the method 210 proceeds to step 228 in which the ether production by the catalytic converter apparatus 178 continues (or begins) to convert ethanol into ether. In other words, the controller 110 commands the pump 156, valve 174, and the catalytic converter apparatus 178 (as well as any cooperating elements) to direct ethanol to the catalytic converter apparatus 178 and the resulting converted ether into the reservoir 160. However, in step 226, if the exhaust temperature is out of the exhaust temperature range or if the ether level is equal to the maximum ether level threshold, the method 210 proceeds to step 230 in which the ether production by the catalytic converter apparatus 178 is discontinued. In other words, the controller 110 commands the pump 156, valve 174, and the catalytic converter apparatus 178 (as well as any cooperating elements) to stop ethanol from being directed to and converted into the catalytic converter apparatus 178.

After steps 214, 222, the method 210 returns to step 226 in which the controller 110 continues to evaluate the ether conditions for further production of ether, as necessary. Similarly, after step 224, 228, 230, the method 210 may continue to evaluate engine and power system conditions (e.g., in steps 212, 214, 226, as examples) in order to modify the production of ether and/or the injection of ether, as appropriate. The method 210 may continue until operation of the work vehicle 100 is terminated.

As noted above, the operation and configuration of the power system 108 discussed with reference to FIGS. 1-4 are merely examples, and other operations and configurations may be provided. Additional configurations are discussed below with reference to FIGS. 5-7.

Figure 5:
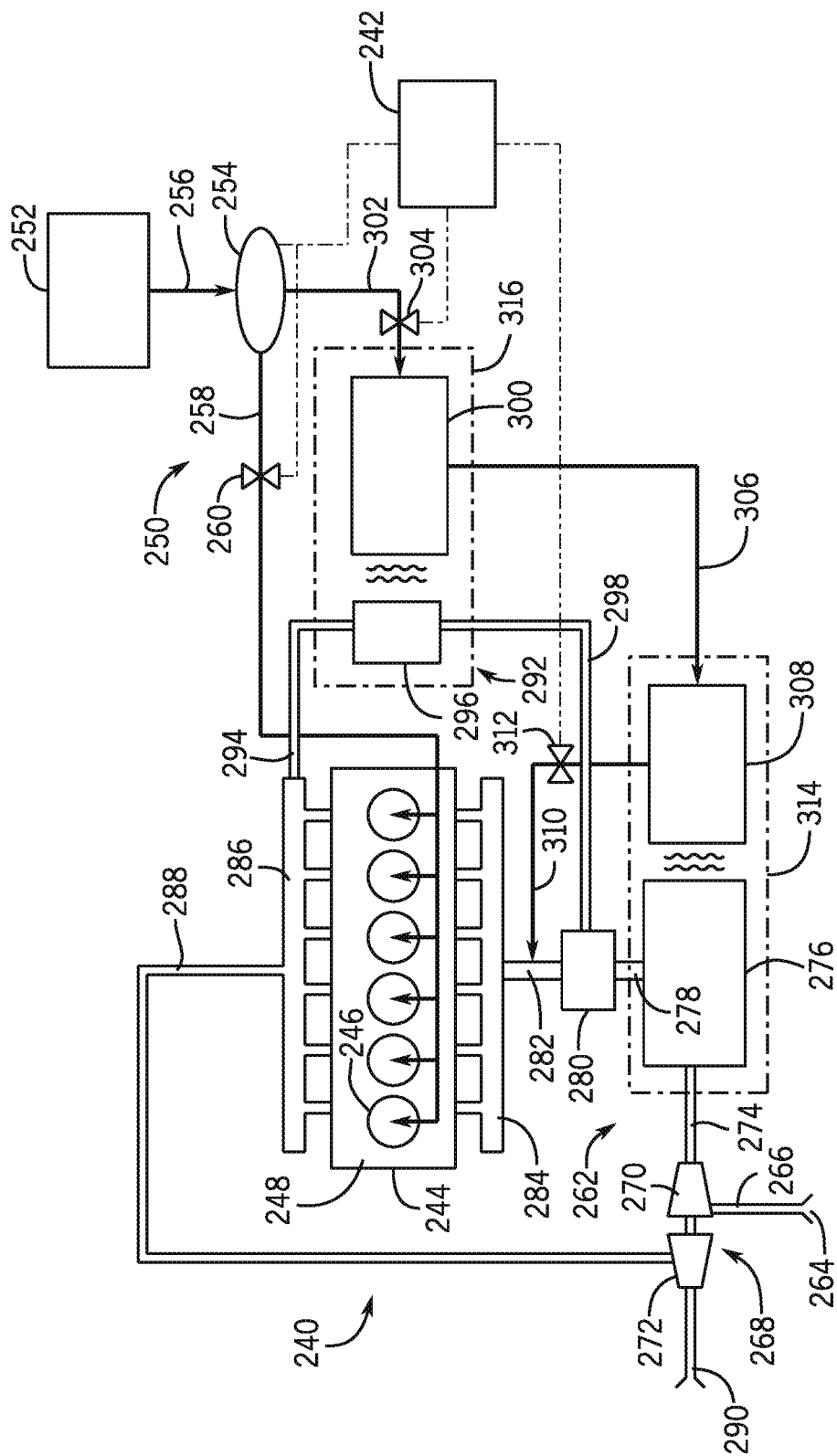
FIG. 5 is a simplified schematic diagram of a power system in accordance with a further example embodiment.

Reference is now made to FIG. 5, which is a schematic illustration of the power system 240 for providing power to a work vehicle (e.g., the work vehicle 100 of FIG. 1), although the characteristics described herein may be applicable to a variety of machines. Unless otherwise noted, the power system 240 of FIG. 5 may be similar to the power system 108 discussed above.

As above, the power system 240 operates based on commands from a controller 242 and includes an engine 244 configured to combust a mixture of fuel from a fuel arrangement 250 and air from an air intake arrangement 262 to generate power for propulsion and various other systems, thereby generating an exhaust gas that is accommodated by an exhaust arrangement 292. The engine 244 is primarily an ethanol engine that is supplemented, as appropriate, with ether and includes of piston-cylinder sets 246 within an engine block 248.

In one example, the fuel arrangement 250 may be considered to include ethanol tank 252, a pump 254, one or more supply lines 256, 258, and one or more control valves 260. In particular, ethanol is stored in the ethanol tank 252, and the pump 254 distributes ethanol to the engine 244 via ethanol supply lines 256, 258. Additional information regarding the fuel arrangement 250 is provided below.

As also noted above, the engine also receives air from the air intake arrangement 262. The air intake arrangement 262 may be considered to include an air intake 264, one or more turbochargers 268, a charge air cooler 276, an air intake mixer 280, an air intake manifold 284, and one or more conduits 266, 274, 278, 282.

The air intake 264 directs fresh or ambient air through an ambient air intake conduit 266 into one or more turbochargers 268 to increase the amount of air subsequently directed into the engine 244 for improved engine efficiency and power input. In particular, the turbocharger 268 includes a compressor 270 driven by a turbine 272, which itself is driven by exhaust gas. The compressor 270 compresses the intake air, which may raise the temperature of the intake air. Although not shown, additional turbochargers (e.g., with one or more additional compressors and/or turbines) may be provided.

Downstream of the turbocharger 268, the compressed intake may be provided via conduit 274 to the charge air cooler 276 that functions to cool the intake air, e.g., so as to increase the unit mass per unit volume of the charge air for improved volumetric efficiency. The charge air cooler 276 may be any suitable mechanism for cooling the air for the engine 244. In one example, the charge air cooler 276 may be implemented as a heat exchange apparatus that reduces intake air temperature from compression by transferring the heat to a cooperating fluid (e.g., air or liquid). Additional information regarding the interactions of the charge air cooler 276 will be discussed below. In some examples, the turbocharger 268 and/or the charge air cooler 276 may be omitted.

From the charge air cooler 276, the cooled intake air may be directed via conduit 278 to the intake mixer 280 in which the intake air is mixed with recirculated exhaust gas and subsequently directed via conduit 282 into the air intake manifold 284. In some examples, the intake mixer 280 may mix the fresh intake gas and recirculated gas (generally, intake gas) prior to directing the intake gas into the intake manifold 284. In some examples, the intake mixer 280 and intake manifold 284 may be combined (i.e., a dedicated intake mixer 280 may be omitted and/or the intake manifold 284 may be considered part of the engine 244 (or other system)). In any event, the intake manifold 284 distributes the intake gas into the piston-cylinder sets 246 of the engine block 248. As is typical, the intake gas is mixed with fuel and ignited such that the resulting combustion products drive the mechanical output of the engine 244.

The exhaust gas produced from the combustion process may be received by an exhaust manifold 286 of the exhaust arrangement 292. At least a portion of the exhaust gas is directed via exhaust conduit 288 to an exhaust outlet 290. As noted above, the exhaust gas may also function to drive the turbine 272 of the turbocharger 268. Although not shown in detail, the exhaust gas may flow through one or more exhaust treatment components arranged downstream of exhaust outlet 290 . Such exhaust treatment components may function to treat the exhaust gas passing therethrough to reduce undesirable emissions and may include components such as a diesel oxidation catalyst (DOC), a diesel particulate filter (DPF), a selective catalytic reduction (SCR) system, and the like. Subsequently, the exhaust gas is expelled into the atmosphere via a tailpipe.

In this example, the exhaust arrangement 292 may also operate as an exhaust gas recirculation (EGR) arrangement. As such, the exhaust manifold 286 may further be generally configured to recirculate a portion of the exhaust gas generated by the engine 244 through conduits 294, 298 into the intake mixer 280 for mixing with the fresh intake air, which in turn reduces the formation of NOx during combustion than may otherwise occur. In some examples, the flow of recirculated gas through the exhaust arrangement 292 may be at least partially controlled via an EGR distribution valve (not shown) positioned on the first or second exhaust conduits 294, 298. Any suitable amount of exhaust gas may be recirculated (e.g., 10%-20%).

In one example, the EGR portion of the exhaust arrangement 292 includes the first (or hot side) conduit 294 that directs through the exhaust gas through an EGR cooler 296 to cool the recirculated gas flowing therethrough prior to being directed via the second (or cool side) conduit 298 into the intake mixer 280, although in some examples, a further conduit and valve arrangement may be provided to bypass the EGR cooler 296 under certain conditions. The EGR cooler 296 may be any suitable device configured to lower the temperature of the recirculated gas. Generally, the EGR cooler 296 includes one or more recirculated gas passages and one or more coolant passages, arranged such that heat may be transferred from the recirculated gas to a cooperating fluid (e.g., air or liquid). Additional information regarding the EGR cooler 296 will be discussed below. In some examples, the EGR portions of the exhaust arrangement 292 may be omitted.

Additional information regarding the air and fuel arrangements 250, 262 will now be provided, particularly the use of ethanol and ether to support combustion.

As noted above, the fuel arrangement 250 is primarily configured to supply ethanol to the engine 120 as fuel. In one example, the pump 254 (or other apparatus) may distribute a portion of the ethanol to a catalytic converter 300 via line 302. In some examples, the distribution of ethanol to the catalytic converter 300 may be controlled with a valve 304 based on commands from the controller 242, as discussed in greater detail below. The catalytic converter 300 converts the ethanol to ether in a manner similar to that discussed above, although modifications may be provided, as discussed in greater detail below.

As shown, the ether mixture (e.g., ether, water, and/or unconverted ethanol, if present) are directed from the catalytic converter 300 via an ether line 306 to an ether reservoir 308. The ether reservoir 308 provides a mechanism for distributing ether to the air intake arrangement 262 for introduction into the engine 244. Moreover, the ether reservoir 308 provides a storage mechanism for distributing ether when the catalytic converter 300 is not able to convert ethanol into ether. Such conditions may occur at low temperatures, particularly immediately prior to and subsequent to ignition. As such, the ether reservoir 308 may be provided to store ether that was generated during prior engine operation in an amount sufficient to ensure ignition and combustion until the catalytic converter 300 can reach a temperature that enables the replenishment of the ether. Control of the ether between the reservoir 308 and the air intake arrangement 262 may be facilitated by a control valve 312 that may be activated by the controller 242.

In this example, the ether is introduced into the engine 244 via the air intake arrangement 262. As noted, the air intake 264, turbocharger 268, intake mixer 280, and at least portions of the exhaust arrangement 292 may be considered part of the air intake arrangement 262 that directs air into the engine 244. As one example, and as shown in FIG. 5, the ether is directed via line 310 to the air intake conduit 282 immediately upstream of the intake manifold 284, although as noted above, the ether may be provided to other aspects of the air intake arrangement 262, including the intake mixer 280.

The catalytic converter 300 and/or ether reservoir 308 may be stand-alone elements. However, in some examples, catalytic converter 300 and/or ether reservoir 308 may be integrated into other aspects of the power system 240. As noted above, the catalytic converter 300 and/or ether reservoir 308 may benefit from elevated temperatures, particularly since a typical temperature range of the exhaust gas and/or other elevated air temperatures may overlap with the temperature window for conversion of ethanol into ether and/or for separating the ether from water. As such, in some examples, catalytic converter 300 and/or ether reservoir 308 may be integrated with and/or otherwise cooperate with other aspects of the power system 240 to supply heating to the catalytic converter 300 and/or ether reservoir 308, thereby enhancing operation.

In the example of FIG. 5, the catalytic converter 300 may be integrated with the EGR cooler 296 as an integrated cooler converter 316. In effect, the integrated cooler converter 316 may operate as a heat exchanger in which the fluids of the catalytic converter 300 absorbs at least a portion of the heat from the exhaust in the EGR cooler 296, e.g., the catalytic converter 300 may utilize the heat from the exhaust gas flowing through the EGR cooler 296 to facilitate the chemical reaction of ethanol into ether. The cooperation between the catalytic converter 300 and the EGR cooler 296 within the integrated cooler converter 316 provides at least two advantages. In particular, the heat from the EGR cooler 296 facilitates and/or enhances the operation of the catalytic converter 300; and moreover, heat from the EGR cooler 296 would otherwise have to be removed by a separate cooling arrangement in order to cool the air flowing through the EGR cooler 296 (although such a cooling arrangement may additionally be provided).

Similarly, in the example of FIG. 5, the ether reservoir 308 may be integrated with the charge air cooler 276 as an integrated cooler reservoir 314. In effect, the integrated cooler reservoir 314 may operate as a heat exchanger in which the ether reservoir 308 absorbs at least a portion of the heat from the charge air cooler 276, e.g., the ether reservoir 308 may utilize the heat from the compressed intake gas flowing through the charge air cooler 276 to facilitate the evaporation of ether and/or the removal of water from the reservoir 308. The cooperation between the ether reservoir 308 and the charge air cooler 276 within the integrated cooler reservoir 314 provides at least two advantages. In particular, the heat from the charge air cooler 276 facilitates and/or enhances the operation of the reservoir 308; and moreover, heat from the charge air cooler 276 would otherwise have to be removed by a separate cooling arrangement in order to cool the air flowing through the charge air cooler 276 (although such a cooling arrangement may additionally be provided).

Figure 6:
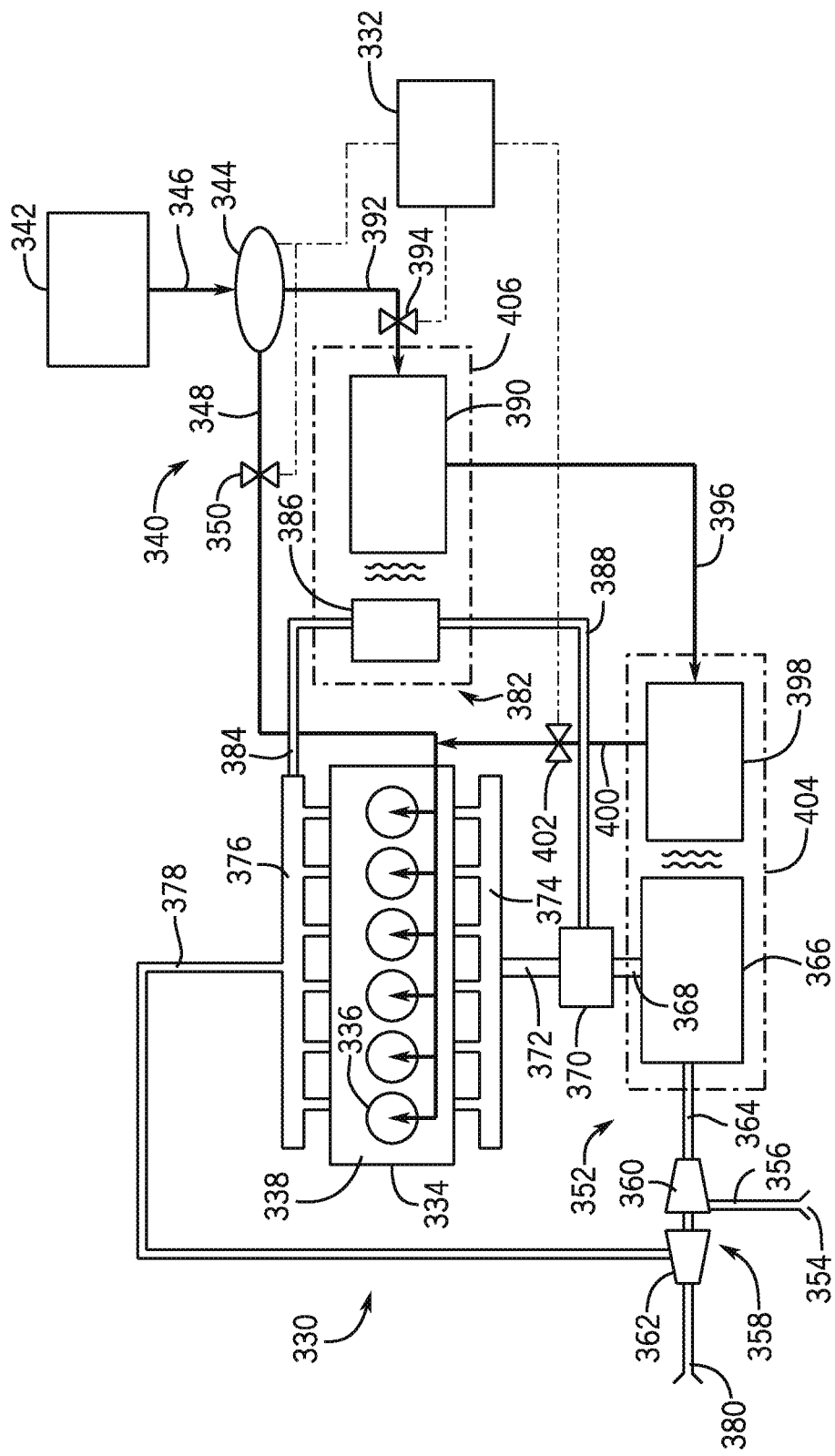
FIG. 6 is a simplified schematic diagram of a power system in accordance with a further example embodiment.

Reference is now made to FIG. 6, which is a schematic illustration of a further power system 330 for providing power to a work vehicle (e.g., the work vehicle 100 of FIG. 1), although the characteristics described herein may be applicable to a variety of machines. Unless otherwise noted, the power system 330 may be similar to the power system 108 discussed above.

As above, the power system 330 operates based on commands from a controller 332 and includes an engine 334 configured to combust a mixture of fuel from a fuel arrangement 340 and air from an air intake arrangement 352 to generate power for propulsion and various other systems, thereby generating an exhaust gas that is accommodated by an exhaust arrangement 382. The engine 334 is primarily an ethanol engine that is supplemented, as appropriate, with ether and includes of piston-cylinder sets 336 within an engine block 338.

In one example, the fuel arrangement 340 may be considered to include an ethanol tank 342, a pump 344, one or more supply lines 346, 348, and one or more control valves 350 that generally operate as described above with reference to FIG. 5. As also noted above, the engine also receives air from the air intake arrangement 352, which includes an intake assembly 354, one or more turbochargers 358, a charge air cooler 366, an intake mixer 370, an air intake manifold 374, and one or more conduits 356, 364, 368, 372, which also operate in a manner similar to that discussed above with reference to FIG. 5. As is typical, the intake gas is mixed with fuel and ignited such that the resulting combustion products drive the mechanical output of the engine 244. Further, the exhaust gas produced from the combustion process may be received by an exhaust manifold 376 of the exhaust arrangement 382. At least a portion of the exhaust gas is directed via exhaust conduit 378 to an exhaust outlet 380, as above. In this example, the exhaust arrangement 382 may also operate as an exhaust gas recirculation (EGR) arrangement to recirculate a portion of the exhaust gas generated by the engine 334 through conduits 384, 388, and EGR cooler 386, and into the intake mixer 370 for mixing with the fresh intake air.

Additional information regarding the air and fuel arrangements 340, 352 will now be provided, particularly the use of ethanol and ether to support combustion. As noted above, the fuel arrangement 340 is primarily configured to supply ethanol to the engine 120 as fuel. In one example, the pump 344 (or other apparatus) may distribute a portion of the ethanol to a catalytic converter 390 via line 392, controlled with a valve 394 and based on commands from the controller 332. The catalytic converter 390 converts the ethanol to an ether mixture (e.g., ether, water, and/or unconverted ethanol, if present), which is then directed via an ether line 396 to an ether reservoir 398 in a manner similar to that discussed above.

In contrast to the power system 240 discussed above with reference to FIG. 5, the power system 330 operates to inject at least the ether from the reservoir 398 into the fuel arrangement 340 via line 400, which may be controlled via valve 402. Any suitable manner for injecting the ether into the fuel arrangement 340, including injection into an ethanol fuel rail for mixing with the ethanol prior to injection into the engine 334 and/or injection via a separate fuel rail (e.g., in manner similar to the arrangement of FIG. 2).

The catalytic converter 390 and/or ether reservoir 398 may be stand-alone elements. However, in some examples, catalytic converter 390 and/or ether reservoir 398 may be integrated into other aspects of the power system 330. Similar to the power system 240 of FIG. 5, the catalytic converter 390 may be integrated with the EGR cooler 386 as an integrated cooler converter 406, and the ether reservoir 398 may be integrated with the charge air cooler 366 as an integrated cooler reservoir 404.

In the example of FIG. 2, the catalytic converter 182 is heated with an electric heating element 180. Further, in the examples of FIGS. 5 and 6, the catalytic converter 300, 390 may be integrated with the EGR cooler 296, 386 such that heat from the exhaust gas may facilitate the chemical reaction within the catalytic converter 300, 390. Additionally, in other examples, the catalytic converter may be heated by other mechanisms. One such mechanism may include integration of the catalytic converter with the charge air cooler (e.g., charge air cooler 276, 366) such that heat from the compressed air may be transferred to the catalytic converter.

Figure 7:
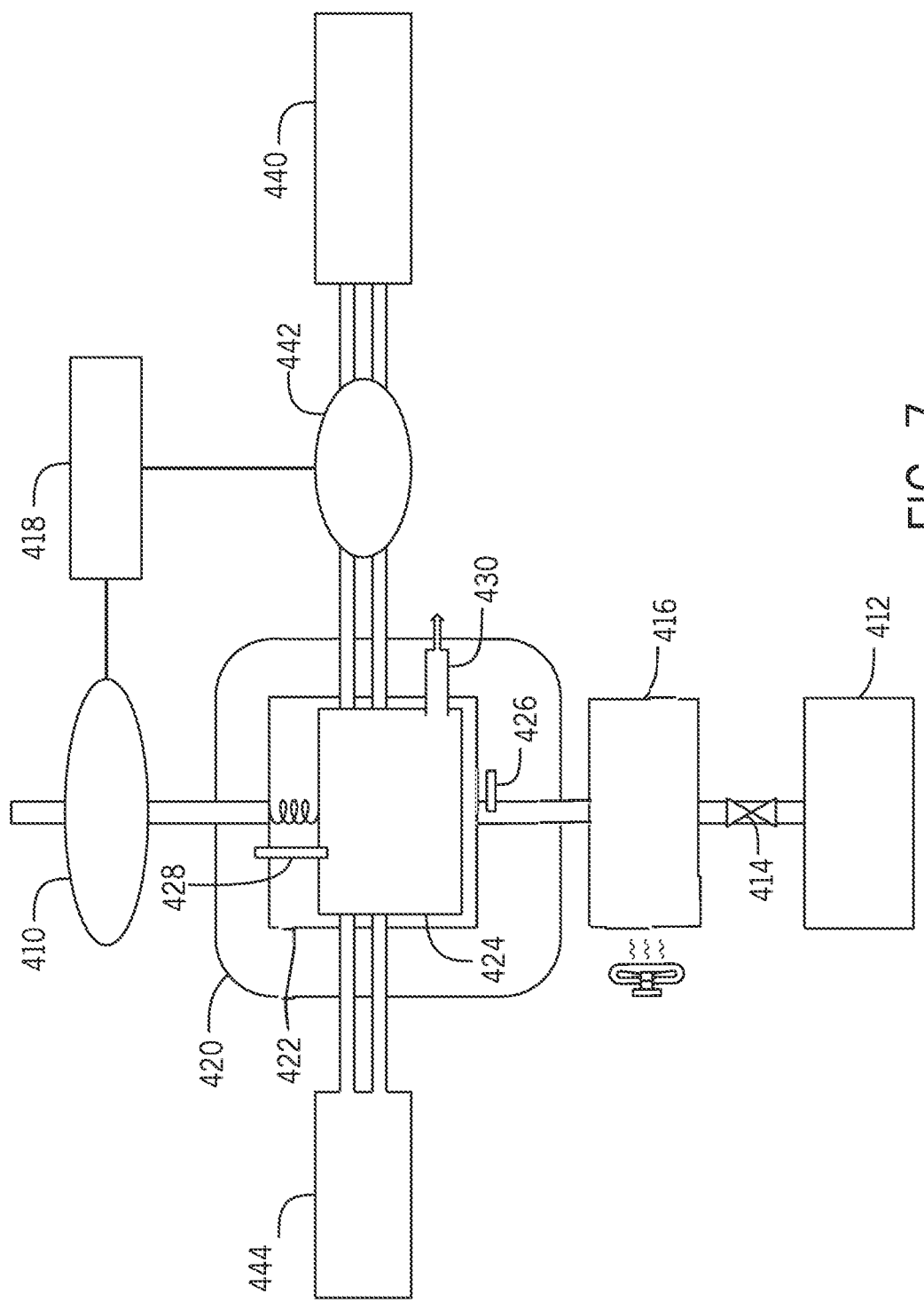
FIG. 7 is a more detailed schematic diagram of a portion of a power system in accordance with an example embodiment.

As noted above, the mechanisms for converting ethanol to ethyl may take various forms. A schematic view of an additional configuration is depicted in FIG. 7, particularly a catalytic converter apparatus 420 and associated elements that may be incorporated into the power systems discussed herein. As shown, and similar to the example of FIG. 3, the catalytic converter apparatus 420 receives ethanol via an ethanol pump 410 powered by a power source 418 and converts the ethanol into an ether mixture that is directed through a condenser 416 and stored in an ether reservoir 412 with check valve 414.

As shown, the catalytic converter apparatus 420 includes a heating element 422 that surrounds a catalytic converter 424. As above, the catalytic converter apparatus 420 may include pressure and temperature sensors 426, 428 and a safety relief valve 430.

In this example, the heating element 422 may cooperate with an oil (or other fluid) based heat exchanger arrangement. In particular an oil reservoir 440 may store a supply of oil (e.g., a silicon-based oil, stable to 750° C., as an example). An oil pump 442, powered by the power source 418, circulates the oil through the heating element 422 and a heat exchanger 444. The heat exchanger 444 may be remotely mounted as a coil or tube arrangement to receive heat from a heat source (such as from exhaust gas, an EGR cooler, or a charge air cooler), and the heated oil may function within the heating element 422 to heat the ethanol within or upstream of the catalytic converter 424, thereby facilitating the chemical conversion of ethanol into ether.

Accordingly, the power systems discussed above provide the on-board conversion of ethanol into ether in order to operate a compression combustion engine over a range of conditions, including cold starts and low load conditions. Generally, such power systems may be dedicated ethanol-based power systems. However, in some examples, existing diesel-type engines may be modified to operate as discussed above. Overall, the power systems described herein result in a platform architecture that may provide improved fuel consumption, higher performance, and reduced criteria pollutants. Moreover, even though the conversion of ethanol into the ether may include byproducts (e.g., water or unconverted ethanol), it noted that high yield of ether formation or high purity of ether may not be critical to achieve the primary objectives of improving engine cold start and combustion stability as long as ether is present, thereby providing a number of hardware implementations over a relatively wide temperature operating window.

During operation, the power systems may leverage exhaust heat to reach dehydration temperature and/or conversion temperatures, or in other examples, dedicated electric heating may be provided. In some examples, the systems may have a control board for actuation-based temperature and pressure control and diagnostics.

The on-board conversion of ethanol into ether by the catalytic converter provides a number of advantages, including obviating a separate ether tank that must be filled and maintained by the operator. The use of ethanol as fuel in a diesel-like combustion mode provides benefits from high brake thermal efficiency and low exhaust temperatures. Moreover, combustion of ethanol produces relatively little soot and/or coking.

In addition to the elements, systems, and arrangements of the power systems discussed above, additional components and processes may be provided to facilitate the conversion of ethanol into ether and the subsequent use of ethanol and/or ether as fuel sources. For example, the compression ratio of the engine and/or EGR temperatures may be increased; and further, cylinder thermal coatings, intake heaters, fuel additives, precombustion chambers, and/or glow plugs may be provided. However, in some embodiments, use of the power systems disclosed herein may obviate or mitigate any engine modifications and recover the performance of an ethanol engine to the same level of a regular diesel engine. In other words, design changes to auxiliary components as add-on technology package to existing diesel engine base architecture may be limited.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer- usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
an alcohol tank configured to store alcohol;
a catalytic converter fluidly coupled to receive alcohol from the alcohol tank and configured to convert the alcohol into ether;
an ether reservoir to store the ether;
an air intake arrangement with a charge air cooler integrated with the ether reservoir such that heat is transferred from air in the charge air cooler to the ether reservoir; and
an engine including one or more piston-cylinder sets configured to selectively receive the alcohol stored in the alcohol tank and the ether converted by the catalytic converter and to combust the alcohol and the ether with air to produce mechanical power and exhaust gas.

2. The power system of claim 1, wherein the engine is a compression combustion engine.

3. The power system of claim 1, wherein the alcohol is ethanol and the ether is diethyl ether.

4. The power system of claim 3, further comprising an ether fuel rail configured to inject the ether into the piston-cylinder sets.

5. The power system of claim 3, wherein the ether is introduced into the piston-cylinder sets with the air.

6. The power system of claim 3, whether the ether is mixed with ethanol prior to injection into the piston-cylinder sets.

7. The power system of claim 3, further comprising an electric heating element configured to heat the catalytic converter in order to facilitate the conversion of ethanol into ether.

8. The power system of claim 3, wherein the catalytic converter is arranged such that the exhaust gas heats the catalytic converter in order to facilitate the conversion of ethanol into ether.

9. The power system of claim 3, further comprising an exhaust gas recirculation (EGR) arrangement configured to direct at least a portion of the exhaust gas back into the engine, wherein the EGR arrangement includes an EGR cooler configured to cool the portion of the exhaust gas, and wherein the EGR cooler is integrated with the catalytic converter such that heat is transferred from the exhaust gas to the catalytic converter in order to facilitate conversion of the ethanol into ether.

10. The power system of claim 3, wherein the ratio of ether to ethanol introduced into the engine is approximately 0.5%-95%.

11. The power system of claim 3, further comprising controller configured to selectively control an amount of ethanol and an amount of ether that are directed into the engine.

12. The power system of claim 11, wherein the controller is configured to receive temperature information and the selectively control the amount of ethanol and the amount of ether that are directed into the engine based on the temperature information.

13. The power system of claim 12,
wherein, when the temperature information indicates a first temperature is less than a temperature threshold, the controller is configured to direct both ethanol and ether into the engine; and
wherein, when the temperature information indicates the first temperature reaches or exceeds the temperature threshold, the controller is configured to direct only ethanol into the engine.

14. A method for operating a work vehicle power system with a compression combustion engine, comprising:

directing a first portion of ethanol from an ethanol tank into a catalytic converter;
converting the first portion of ethanol within the catalytic converter into diethyl ether;
storing the diethyl ether in an ether reservoir of an air intake arrangement having a charge air cooler integrated with the ether reservoir such that heat is transferred from air in the charge air cooler to the ether reservoir;
directing a second portion of the ethanol from the ethanol tank into the compression combustion engine for ignition and combustion; and
selectively directing the diethyl ether from the ether reservoir into the compression combustion engine to supplement the ignition and combustion of the second portion of the ethanol.

15. The method of claim 14,
further comprising collecting temperature information with one or more temperature sensors to determine a cold start condition; and
wherein the selectively directing the diethyl ether from the ether reservoir into the compression combustion engine occurs during the cold start condition of the compression combustion engine.

16. The method of claim 15, wherein the selectively directing the diethyl ether from the ether reservoir into the compression combustion engine is discontinued when the temperature information indicates that the engine is no longer in the cold start condition.

17. The method of claim 14, further comprising heating the catalytic converter to facilitate the conversion of the first portion of ethanol into the diethyl ether.

18. The method of claim 14, further comprising maintaining a temperature of the ether reservoir at less than 100° C.

* * * * *